US010894512B2

(12) United States Patent
Phillips

(10) Patent No.: US 10,894,512 B2
(45) Date of Patent: Jan. 19, 2021

(54) SIDE-FACING SIDE VIEW MIRROR BRAKE LIGHTS

(71) Applicant: Gregory J. Phillips, Geneva, NY (US)

(72) Inventor: Gregory J. Phillips, Geneva, NY (US)

( * ) Notice: Subject to any disclaimer, the term of this patent is extended or adjusted under 35 U.S.C. 154(b) by 0 days.

(21) Appl. No.: 16/381,346

(22) Filed: Apr. 11, 2019

(65) Prior Publication Data
US 2020/0324704 A1 Oct. 15, 2020

(51) Int. Cl.
B60R 1/12 (2006.01)
B60Q 1/26 (2006.01)
B60Q 1/44 (2006.01)
B60R 1/00 (2006.01)

(52) U.S. Cl.
CPC .......... *B60R 1/1207* (2013.01); *B60Q 1/2661* (2013.01); *B60Q 1/441* (2013.01); *B60R 1/006* (2013.01)

(58) Field of Classification Search
CPC ..... B60R 1/006; B60R 1/1207; B60Q 1/2661; B60Q 1/441
See application file for complete search history.

(56) References Cited

U.S. PATENT DOCUMENTS

| | | | |
|---|---|---|---|
| 2,561,582 | A | 7/1951 | Marbel |
| 2,733,311 | A | 1/1956 | Brown |
| 3,665,392 | A | 5/1972 | Annas |
| 3,784,974 | A | 1/1974 | Hamashige |
| 4,583,155 | A | 4/1986 | Hart |
| 4,808,968 | A | 2/1989 | Caine |
| 5,109,214 | A | 4/1992 | Heidman, Jr. |
| 5,126,926 | A | 5/1992 | Chiang Wen |

(Continued)

FOREIGN PATENT DOCUMENTS

FR 1430674 A 3/1966

OTHER PUBLICATIONS

Website Article: https://www.nytimes.com/2001/10/10/automobiles/your-mirror-is-trying-to-send-me-a-message.html Downloaded Mar. 23, 2018 Author: Tim Moran, article dated Oct. 10, 2001 Your Mirror Is Trying to Send Me a Message Relevant portions of article are highlighted.

(Continued)

Primary Examiner — Alan B Cariaso
(74) Attorney, Agent, or Firm — Russ Weinzimmer & Associates, P.C.

(57) ABSTRACT

A side-facing brake light assembly, including a left side-facing brake light incorporated into a left side view mirror and a right side-facing brake light incorporated into a right side view mirror, the left and right side-facing brake lights operable by an electrical circuit. Both the left side-facing and right side-facing brake lights are positioned and directed such that drivers and pedestrians on both the right side and the left side of the vehicle can see when the brakes of the vehicle have been applied, especially useful as the vehicle approaches an intersection. The side-facing brake light apparatus of the invention more effectively communicates the intention of the driver as he/she approaches the intersection, thereby increasing the safety of other drivers and pedestrians. The side-facing brake light apparatus of the invention helps to avoid serious collisions, property damage, and loss of life due to misunderstandings of other drivers and pedestrians.

9 Claims, 4 Drawing Sheets

(56) References Cited

U.S. PATENT DOCUMENTS

| | | |
|---|---|---|
| 5,255,165 A | 10/1993 | Cail |
| 5,258,740 A | 11/1993 | Viano et al. |
| 5,373,426 A | 12/1994 | O'Sullivan |
| 5,497,304 A | 3/1996 | Caine |
| 5,497,305 A | 3/1996 | Pastrick et al. |
| 5,631,628 A | 5/1997 | Solis, Jr. |
| 5,680,101 A | 10/1997 | Pitcher |
| 5,758,944 A | 6/1998 | Jandron |
| 5,805,356 A | 9/1998 | McFarland |
| 5,805,366 A | 9/1998 | McFarland |
| 5,823,654 A | 10/1998 | Pastrick et al. |
| 5,966,073 A | 10/1999 | Walton |
| 6,142,656 A | 11/2000 | Kurth |
| 6,152,587 A | 11/2000 | Berg |
| 6,175,602 B1 | 1/2001 | Pastrick et al. |
| 6,176,602 B1 | 1/2001 | Pastrick et al. |
| 6,416,208 B2 | 7/2002 | Pastrick et al. |
| 7,466,222 B2 | 12/2008 | Scott |
| 2005/0281043 A1 | 12/2005 | Eisenbraun |
| 2006/0125615 A1 | 5/2006 | Song |
| 2006/0125616 A1* | 6/2006 | Song ................... B60Q 1/38 340/463 |
| 2014/0333429 A1 | 11/2014 | De La Rosa et al. |

OTHER PUBLICATIONS

Website: https://www.homedepot.com/p/Blazer-International-LED-Anyside-Submersible-Combo-Stop-Tail-Turn-Light-C789RTM/204990335 Downloaded Mar. 23, 2018 LED Anyside Submersible Combo Stop/Tail/Turn Light Submersible 7 function S/T/T light with changeable side marker, patented design works on either side of the trailer, sonically sealed electronics resist moisture and corrosion, 10 diodes on light; 1 diode on the side marker, for use on trailers under 80 in. wide. • 12-Volt.

\* cited by examiner

SIDE-FACING SIDE VIEW MIRROR BRAKE LIGHTS

FIELD OF THE INVENTION

This invention relates generally to vehicle lights, and more particularly to lights on a vehicle that indicate actions of a driver of the vehicle.

BACKGROUND OF THE INVENTION

Today, brake lights (also called "stop lamps") are an important safety feature found in nearly all licensed motor vehicles throughout the world. However, in the early 1900s, drivers of cars and trucks typically used hand signals to indicate to other drivers that they were applying their brakes, thereby giving the other drivers time to react to a slowing vehicle. As motorized vehicles became more popular and nighttime driving became more common, the use of hand signals was replaced by brake lights, because hand signals were not visible at night.

The first use of rear brake lights, as an aftermarket installation, was made in 1905, but brake lights were extremely uncommon at that time. After 1905, some vehicles included brake lights that were manually activated by a hand lever. The first rear brake lights connected to a brake pedal that were installed in a new factory-built automobile were introduced in 1916. By 1918, many cars included front lamps, but rear brake lights were still considered a novelty and were uncommon.

As the number of American motor vehicles grew from 6 million in 1918, to 24 million in 1928, state governments recognized the need to improve vehicle safety by mandating clearly visible rear brake lights that were automatically activated when the driver applied the brakes. In 1928, rear brake light requirements for new vehicles were introduced in 11 American states, however it was not until the 1930s that rear brake lights (that were visible both in darkness and in daylight) became standard equipment on most American vehicles.

During the 1960s and the 1970s, several studies showed a decrease in accident rates if an additional "center high" mounted brake light was added to the rear of a vehicle. As a result, beginning in 1985, all new automobiles sold in the United States are required to include a third center high mounted rear brake light. This center high mounted rear brake light is activated at the same time as the other two rear brake lights, as the driver applies his/her foot to a brake pedal. Because several studies have shown that adding additional brake lighting can improve vehicle safety, additional brake light sources have been proposed.

An example of adding additional brake light sources to a vehicle is taught in Hart, U.S. Pat. No. 4,583,155. Hart teaches a side mounted rear view mirror with a brake light incorporated in the side view mirror housing. However, the brake lighting faces in a rearward direction, and therefore only indicates braking to the vehicles located behind the braking vehicle.

SUMMARY OF THE INVENTION

The side-facing brake light apparatus of the invention are wired so as to illuminate whenever the rear brake lights are on, Consequently, the side-facing brake light apparatus of the invention provides breaking indication light when the brakes are applied that is visible on both sides of the vehicle that is braking. The side-facing brake light apparatus is also visible to an extent forward of the vehicle, thereby providing advance notice of the breaking action sideward and forward of the vehicle. Therefore, drivers and pedestrians approaching from either the right or left side of the trajectory of the oncoming vehicle will be able to see when the brakes of the vehicle have been applied as the vehicles approaches an intersection, as well as in other traffic patterns.

The side-facing brake light apparatus of the invention more effectively communicates the intention of the driver as he/she approaches an intersection, thereby increasing the safety of other drivers and pedestrians. Accordingly, the side-facing brake light apparatus of the invention helps to avoid serious collisions, property damage, and loss of life due to the misunderstandings of other drivers and pedestrians.

A general aspect of the invention is a side-facing brake light apparatus. In a vehicle having a left side and a right side, a left side-view mirror assembly and a right side-view mirror assembly, rear-facing brake lights, and an electrical power and control circuit configured to power the rear-facing brake lights, the side-facing brake light apparatus includes: a left side-facing brake light, incorporated into the left sideview mirror assembly, positioned and directed so as to be viewable from the left side of the vehicle; and a right side-facing brake light, incorporated into the right sideview mirror assembly, positioned and directed so as to be viewable from the right side of the vehicle, the left side-facing brake light and the right side-facing brake light configured to be powered and controlled by the electrical power and control circuit that is configured to power and control the rear-facing brake lights, the left side-facing brake light and the right side-facing brake light positioned and directed such that drivers and pedestrians on the right side and the left side of the vehicle can see when the brakes of the vehicle have been applied.

In some embodiments, the right side-facing brake light is positioned and directed so as to be viewable by drivers and pedestrians rightward and forward along the right side of the vehicle, and the left side-facing brake light is positioned and directed so as to be viewable by drivers and pedestrians leftward and forward along the left side of the vehicle.

In some embodiments, each side-facing brake light includes at least one incandescent lamp.

In some embodiments, each side-facing brake light includes at least one LED lamp.

In some embodiments, each side-facing brake light includes at least one neon lamp.

In some embodiments, each side-facing brake light is directly powered by the electrical circuit.

In some embodiments, the electrical circuit includes an accessory power switch that enables and disables the power to each side-facing brake light.

In some embodiments, a data bus controls and monitors operation of the rear-facing brake lights, the left side-facing break light, and the right side-facing brake light.

In some embodiments, each side-facing brake light is actuated by receiving and responding to control signals from the data bus.

In some embodiments, the data bus is a Controller Area Network bus (CAN bus).

BRIEF DESCRIPTION OF THE DRAWINGS

Many additional features and advantages will become apparent to those skilled in the art upon reading the following description, when considered in conjunction with the accompanying figures, wherein.

DETAILED DESCRIPTION

Figure 1A:
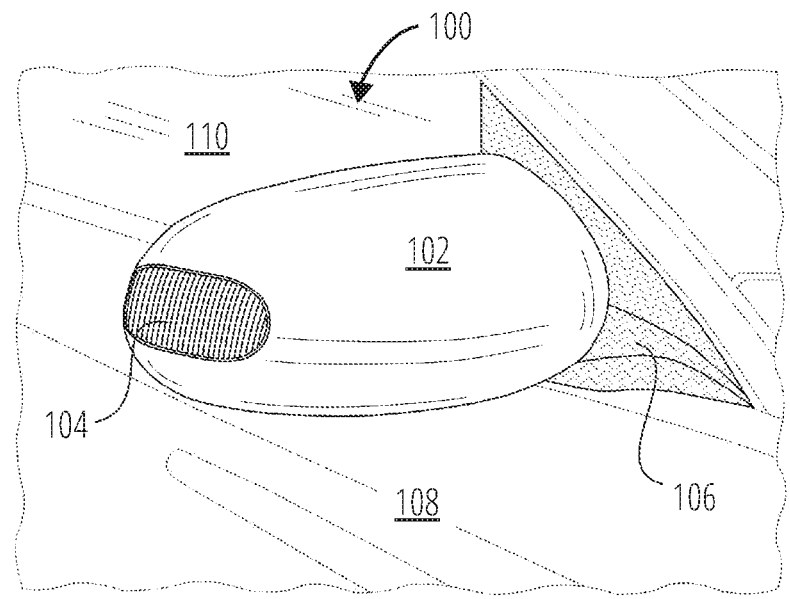
FIG. 1A is a perspective view of a right side view mirror assembly of the invention mounted on the right side of a vehicle, showing the right side-facing brake light incorporated in a right side view mirror.

With reference to FIG. 1A, a perspective view of a right side view mirror assembly 102 of a side-facing brake light apparatus 100 is shown. The right side view mirror assembly 102 is attached to a vehicle 108 by a right side mirror support 106 that is located near a side window 110. A right side-facing brake light 104 is incorporated into the right side view mirror assembly 102. The right side-facing brake light 104 shines light to the right side of the vehicle 108 when the driver of the vehicle 108 applies the brakes of the vehicle, and activates a brake sensor switch 208 (shown in FIG. 2). In some embodiments, the right side-facing brake light 104 shines light both to the right side and also forward along the right side of the vehicle 108. (see FIG. 3).

It is reasonable and desirable that the side-facing brake lights emit red light, and not amber light or white light, since the side-facing brake lights are grouped, coordinated, and/or combined with another rear lighting function that is required to be red, i.e., rear-facing braking lights.

The side-facing brake lights of the invention illuminate steadily, i.e., they do not flash or blink. The side-facing brake lights illuminate only when the rear-facing brake lights are activated when the driver applies the brakes of the vehicle, and illuminate at the same brightness level as the rear-facing brake lights.

Brake lights are formally called "stop lamps" in technical standards and regulations, and in the Vienna Convention on Road Traffic. International UN regulations specify a range of acceptable intensity for a stop lamp of 60 to 185 candela. In North America, where the UN regulations are not recognized, the acceptable range for a single-compartment stop lamp is 80 to 300 candela. Each side-facing brake light can use one or more filament bulbs, or LEDs, or a neon tube as its light source.

The vehicle 108 can be any vehicle that has side mirrors, such as an automobile, a van, a light truck, a truck, or a motorcycle.

Figure 1B:
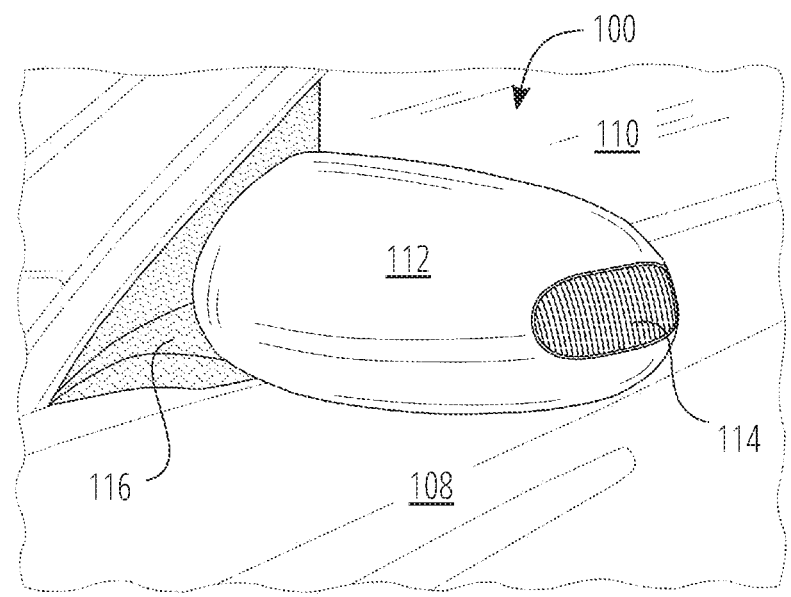
FIG. 1B is a perspective view of a left side view mirror assembly of the invention mounted on the left side of a vehicle, showing the left side-facing brake light incorporated in a left side view mirror.

With reference to FIG. 1B, a perspective view of a left side view mirror assembly 112 of the side-facing brake light apparatus 100 is shown. The left side view mirror assembly 112 is attached to a vehicle 108 by a left side mirror support 116 that is near a side window 110. A left side-facing brake light 114 is incorporated into the left side view mirror assembly 112. The left side-facing brake light 114 shines light to the left side of the vehicle 108 when the driver of the vehicle 108 applies the brakes and activates the brake sensor switch 208 (shown in FIG. 2).

In some embodiments, the left side-facing brake light 114 shines light both to the left side and also forward along the left side of the vehicle 108. (see FIG. 3).

Figure 2:
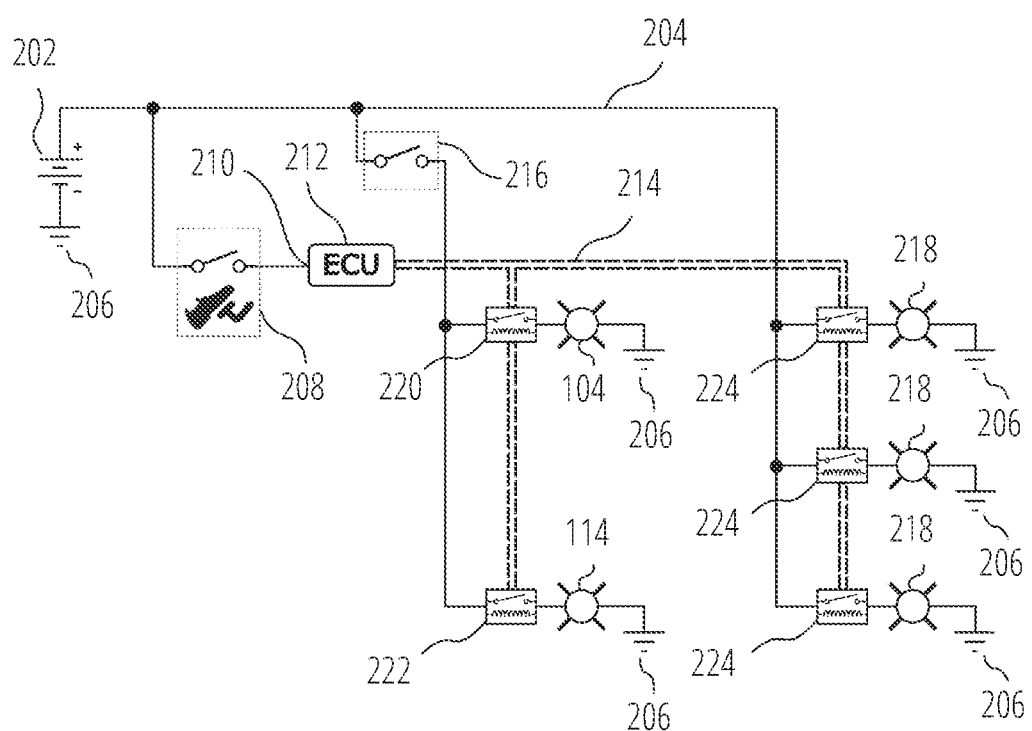
FIG. 2 is a simplified wiring diagram of the side-facing brake light apparatus, including a brake sensor, a brake electronic control unit (ECU), a braking system CAN bus, right side-facing brake light control circuitry, left side-facing brake light control circuitry, an accessory power switch, and rear-facing brake light control circuitry.

With reference to FIG. 2, a simplified wiring diagram of the side-facing brake light apparatus 100 is shown. A vehicle battery 202 that delivers voltage and power via power supply line 204 to the rear brake lights 218 also delivers voltage and power to the right-facing brake light 104 and the left-facing brake light 114 of the side-facing brake light apparatus 100. In this embodiment, the power supply line 204 supplies power through a brake sensor switch 208 connected to an input port 210 that actuates a CAN electronic control unit 212. The brake sensor switch 208 is closed when the driver of the vehicle 108 applies the brakes.

The CAN electronic control unit (ECU) 212 is connected to a CAN bus 214, which is connected to both a right side CAN bus relay 220 and a left side CAN bus relay 222 that switchably provide power to the right side-facing brake light 104, and the left side-facing brake light 114, respectively. The right side-facing brake light 104 and the left side-facing brake light 114 are also connected to ground 206.

The CAN electronic control unit (ECU) 212 is also connected via the CAN bus 214 to the CAN bus relays 224 that switchably provide power to the rear-facing brake lights 218. The rear-facing brake lights 218 are also connected to grounds 206.

When the brakes of the vehicle 108 are applied, the brake sensor switch 208 actuates the CAN electronic control unit (ECU) 212 via the input port 210, and the CAN electronic control unit (ECU) 212 sends a coded digital signal along the CAN bus 214, thereby causing the relays 220 and 222 to energize the right-facing brake light 220 and the left-facing brake light 222, as well as causing the rear CAN bus relays 224 to energize the rear-facing brake lights 218. In some embodiments, a single rear CAN bus relay 224 is used to energize all three rear-facing brake lights 218.

In this embodiment, the power supply line 204 switchably supplies power to the right side CAN bus relay 220 and the left side CAN bus relay 222 through an accessory power switch 216. When the accessory power switch 216 is open, both the right side CAN bus relay 220 and the left side CAN bus relay 222 are disabled. Consequently, the right side-facing brake light 104 and left side-facing brake light 114 will not be illuminated when the driver applies the brakes to close brake sensor switch 208, even though the rear-facing brake lights 218 will be illuminated when the driver applies the brakes. In this way the driver can selectively disable the right side-facing brake light 104 and the left side-facing brake light 114 by turning off the accessory power switch 216.

When the accessory power switch 216 is closed, both the right side CAN bus relay 220 and the left side CAN bus relay 222 are provided with power, and the right side-facing brake light 104 and left side-facing brake light 114 are illuminated if they receive an illumination signal from the CAN electronic control unit 212 via the CAN bus 214.

In alternative embodiments, the accessory power switch 216 is replaced with a hard-wired connection (not shown), and therefore the power supply line 204 is always connected to the right side CAN bus relay 220 and the left side CAN bus relay 222, and the driver cannot disable the right side-facing brake light 104 and the left side-facing brake light 114, and therefore both side lights will always illuminate, along with the rear-facing brake lights 218, whenever the driver applies the brakes.

Figure 3:
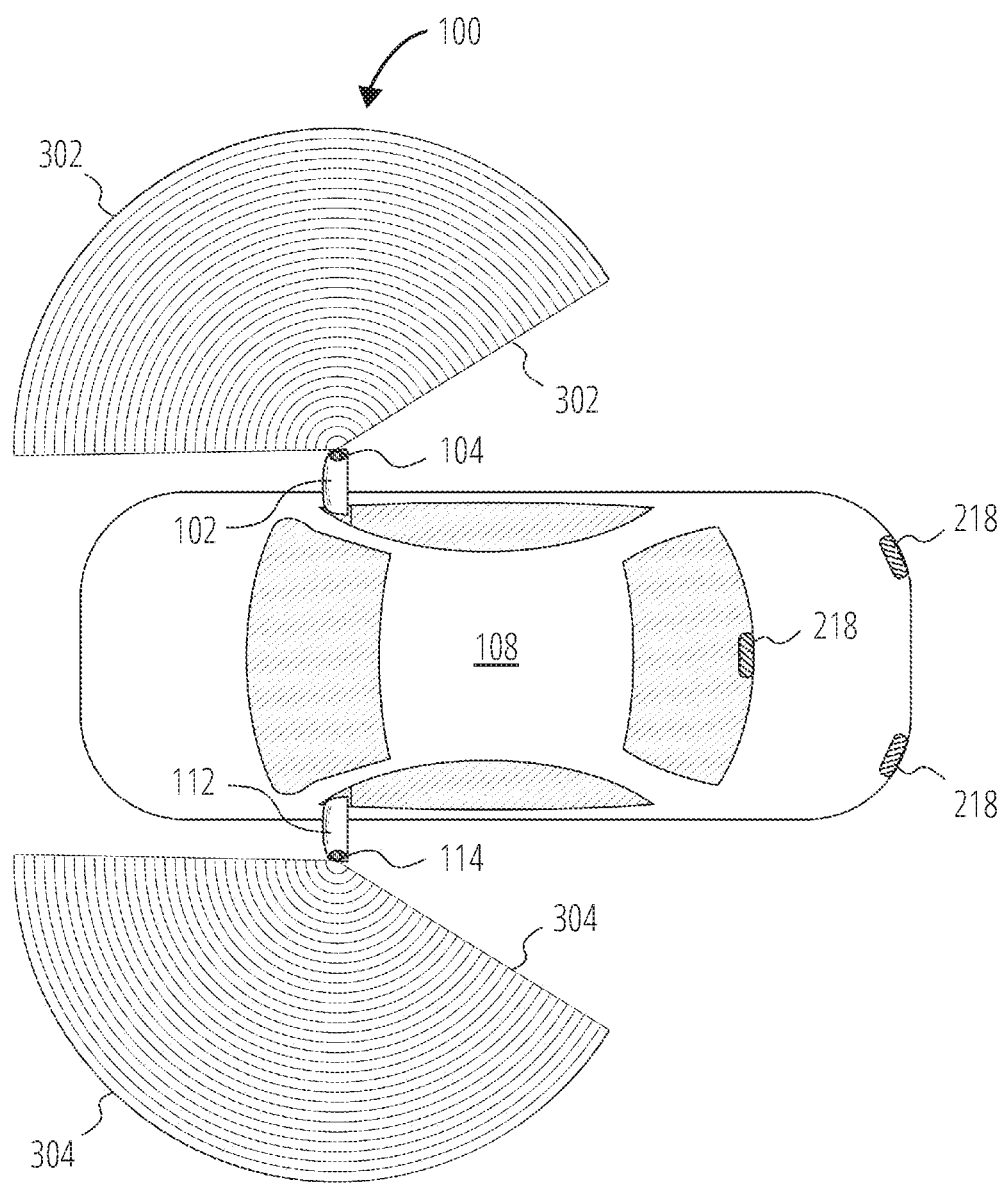
FIG. 3 is a top view of a vehicle including the side view mirror assemblies of FIGS. 1A and 1B, showing an embodiment of the visibility pattern of both the right side-facing brake light and the left side-facing brake light, also showing the rear-facing brake lights.

With reference to FIG. 3, a top view of a vehicle 108 is shown, showing the illumination patterns 302 and 304 emitted by the right-facing brake light 104 and the left-facing brake light 114, respectively. The right illumination pattern 302 is emitted by the right side-facing brake light 104 of the right side view mirror assembly 102, and the left illumination pattern 304 is emitted by the left side-facing brake light 114 of the left side view mirror assembly 112. In this embodiment, the right illumination pattern 302 and the left illumination pattern 304 extend substantially outward from the right and left sides of the vehicle 108, and substantially forward along both the right and left sides of the vehicle 108. Also shown are the rear-facing brake lights 218 that are also illuminated when the driver applies the brakes.

Figure 4:
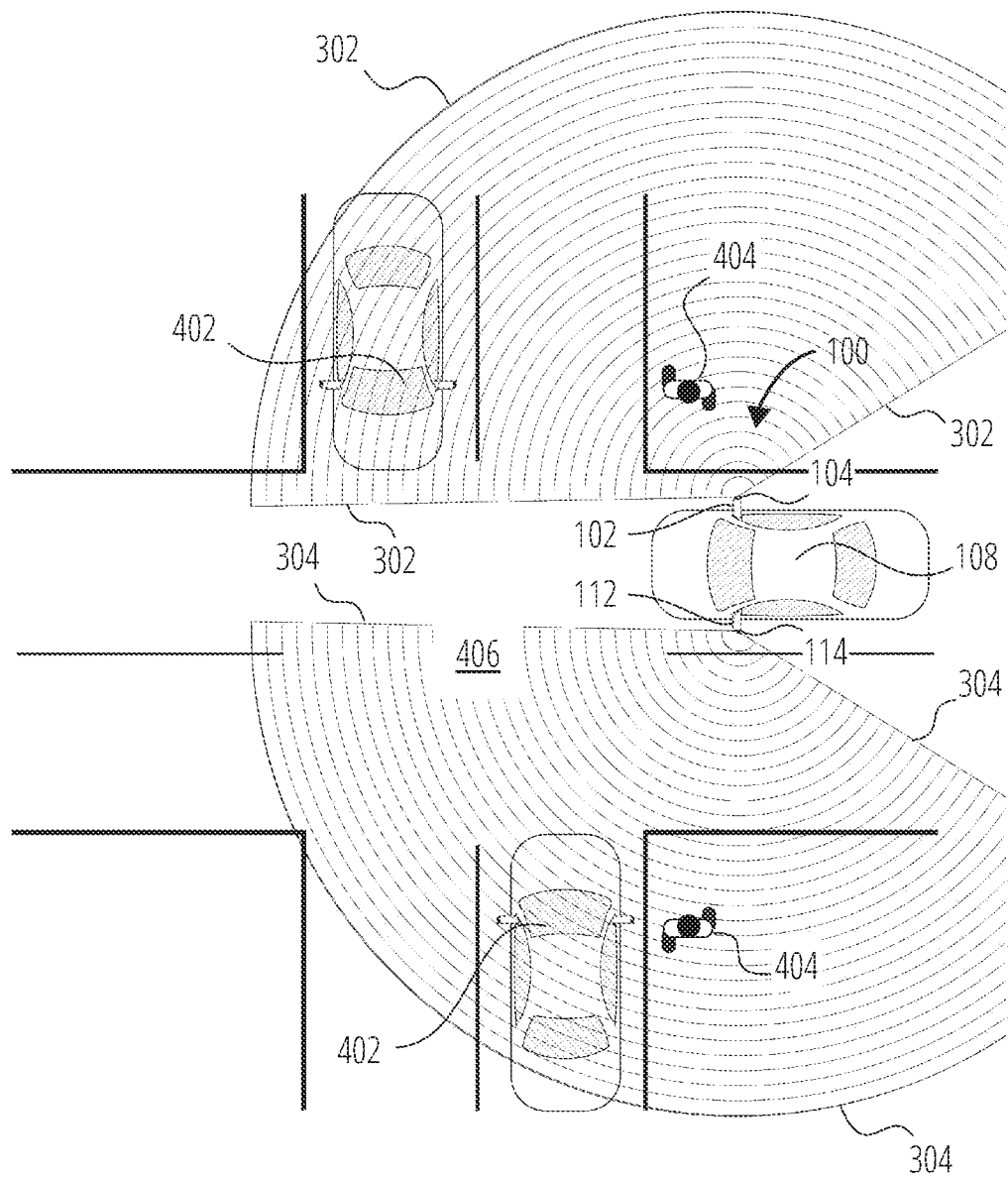
FIG. 4 is a top view of four vehicles approaching an intersection, showing that drivers and pedestrians on both the right and left sides of an approaching vehicle will be able to see when the brakes of the approaching vehicle have been applied as it enters the intersection.

With reference to FIG. 4, a top view of an intersection 406 is shown, also showing drivers 402 and pedestrians 404 on both the right and left sides of the vehicle 108 as the vehicle 108 approaches the intersection 406.

The side-facing brake lights 104 and 114 on the vehicle 108 provide immediate notification of application of brakes to other drivers 402 and pedestrians 404 approaching the intersection 406 perpendicularly to the direction of travel of the vehicle 108.

When the brakes of the vehicle 108 are applied, the right side-facing brake light 104 and the left side-facing brake light 114 cast light according to the right and left illumination patterns 302 and 304, and so the right-facing brake light 104 and the left-facing brake light 114 are visible to the drivers 402 and the pedestrians 404.

Both the right side-facing brake light 104 and the left side-facing brake light 114 are positioned such that the drivers 402 and the pedestrians 404 on both the right side and the left side of the vehicle 108 will be able to see when the brakes of the vehicle 108 have been applied as the vehicle 108 approaches an intersection 406.

Therefore, the side-facing brake light apparatus 100 effectively communicates the intention of the driver to slow down and possibly stop as he/she approaches the intersection 406, and thereby increases the safety of other drivers 402 and pedestrians 404. The side-facing brake light apparatus 100 thereby helps to reduce the likelihood of serious collisions, property damage, and loss of life due to the misunderstandings of other drivers 402 and pedestrians 404.

Other modifications and implementations will occur to those skilled in the art without departing from the spirit and the scope of the invention as claimed. Accordingly, the above description is not intended to limit the invention, except as indicated in the following claims.

What is claimed is:

1. In a vehicle having a left side and a right side, a left side-view mirror assembly and a right side-view mirror assembly, rear-facing brake lights, and an electrical power and control circuit configured to power the rear-facing brake lights, a side-facing brake light apparatus comprising:
   a left side-facing brake light, incorporated into the left sideview mirror assembly, positioned and directed so as to be viewable from the left side of the vehicle; and
   a right side-facing brake light, incorporated into the right sideview mirror assembly, positioned and directed so as to be viewable from the right side of the vehicle,
   the left side-facing brake light and the right side-facing brake light configured to be powered and controlled by the electrical power and control circuit that is configured to power and control the rear-facing brake lights, wherein a data bus controls and monitors operation of the rear-facing brake lights, the left side-facing brake light, and the right side-facing brake light,
   the left side-facing brake light and the right side-facing brake light positioned and directed such that drivers and pedestrians on the right side and the left side of the vehicle can see when the brakes of the vehicle have been applied.

2. The side-facing brake light apparatus of claim 1, wherein:
   the right side-facing brake light is positioned and directed so as to be viewable by drivers and pedestrians rightward and forward along the right side of the vehicle, and
   the left side-facing brake light is positioned and directed so as to be viewable by drivers and pedestrians leftward and forward along the left side of the vehicle.

3. The side-facing brake light apparatus of claim 1, wherein each side-facing brake light includes at least one incandescent lamp.

4. The side-facing brake light apparatus of claim 1, wherein each side-facing brake light includes at least one LED lamp.

5. The side-facing brake light apparatus of claim 1, wherein each side-facing brake light includes at least one neon lamp.

6. The side-facing brake light apparatus of claim 1, wherein each side-facing brake light is directly powered by the electrical circuit.

7. The side-facing brake light apparatus of claim 6, wherein the electrical circuit includes an accessory power switch that enables and disables the power to each side-facing brake light.

8. The side-facing brake light apparatus of claim 1, wherein each side-facing brake light is actuated by receiving and responding to control signals from the data bus.

9. The side-facing brake light apparatus of claim 1, wherein the data bus is a Controller Area Network bus (CAN bus).

* * * * *